United States Patent [19]
Yang

[11] Patent Number: 5,873,425
[45] Date of Patent: Feb. 23, 1999

[54] MOTORIZED STROLLER WITH REAR WHEEL DRIVE ASSEMBLY

[76] Inventor: Chih-Huang Yang, No. 1-3, Lane 38, Jui-Fung St., Nan Dist., Taichung City, Taiwan

[21] Appl. No.: 882,631

[22] Filed: Jun. 25, 1997

[51] Int. Cl.$^6$ ..................................................... B60K 7/00
[52] U.S. Cl. .......................... 180/65.6; 180/216; 180/342; 180/907
[58] Field of Search ............................ 180/166, 11, 180, 180/181, 216, 221, 342, 65.1, 65.5, 65.6, 60, 907

[56] References Cited

U.S. PATENT DOCUMENTS

| | | | |
|---|---|---|---|
| 2,574,824 | 11/1951 | Garelli | 180/221 |
| 2,798,565 | 7/1957 | Rosenthal et al. | 180/342 X |
| 3,199,621 | 8/1965 | Seaman | 180/11 |
| 3,786,887 | 1/1974 | Rosenthal et al. | 180/907 X |
| 3,978,936 | 9/1976 | Schwartz | 180/221 |
| 4,629,950 | 12/1986 | Ching | 180/166 X |
| 5,542,690 | 8/1996 | Kozicki | 180/907 X |

*Primary Examiner*—Robert J. Oberleitner
*Assistant Examiner*—Michael Mar
*Attorney, Agent, or Firm*—Fish & Richardson P.C.

[57] ABSTRACT

The rear wheel drive assembly of a motorized stroller includes a transmission unit, a bidirectional motor, a battery unit and a control unit. The transmission unit includes a gear housing to be mounted on a rear wheel support rod of a stroller frame, and a speed reducing gear set mounted operably in the gear housing. The gear set includes an input gear, an output gear driven rotatably by the input gear, and a knurled roller mounted coaxially on one side of the output gear and extending partially out of an open bottom end of the gear housing. The knurled roller contacts the tire portion of a rear wheel on the support rod such that rotation of the input gear results in corresponding rotation of the knurled roller in order to generate friction between the knurled roller and the rear wheel. The motor is mounted on the gear housing and drives rotatably the input gear. The battery unit includes a battery holder mounted on the stroller frame and adapted to receive a storage battery therein. The control unit is connected electrically to the motor and the electrical contacts on the battery holder, and is operable so as to control direction of rotation of the drive shaft of the motor to control, in turn, forward and backward movement of the stroller frame.

8 Claims, 4 Drawing Sheets

MOTORIZED STROLLER WITH REAR WHEEL DRIVE ASSEMBLY

BACKGROUND OF THE INVENTION

1. Field of the Invention

The invention relates to a stroller, more particularly to a motorized stroller with a rear wheel drive assembly.

2. Description of the Related Art

While conventional strollers enable parents or guardians to take infants along without the need for carrying them, the conventional strollers are still relatively inconvenient to use due to the requirement of pushing or pulling the stroller, especially when the conventional strollers are used on inclined paths or when one has to bring heavy or bulky items with him at the same time.

SUMMARY OF THE INVENTION

Therefore, the object of the invention is to provide a motorized stroller with a rear wheel drive assembly to permit movement of the stroller without the need for manually pushing or pulling the same.

According to one aspect of the present invention, a motorized stroller comprises:

- a stroller frame including a pair of front wheel support rods, a pair of front wheel units mounted rotatably and respectively on distal ends of the front wheel support rods, a pair of rear wheel support rods, a wheel axle which extends between and which is mounted rotatably on distal ends of the rear wheel support rods, and a pair of rear wheels mounted non-rotatably and respectively on distal ends of the wheel axle for co-rotation therewith, each of the rear wheels having a wheel frame portion and a tire portion on the wheel frame portion;
- a transmission unit including a gear housing mounted on one of the rear wheel support rods, and a speed reducing gear set mounted operably in the gear housing, the gear housing having an open bottom end, the speed reducing gear set including an input gear, an output gear driven rotatably by the input gear, and a knurled roller mounted coaxially on one side of the output gear and extending partially out of the gear housing at the open bottom end for contacting the tire portion of one of the rear wheels such that rotation of the input gear results in corresponding rotation of the knurled roller in order to generate friction between the knurled roller and said one of the rear wheels for rotating the rear wheels and the wheel axle relative to the rear wheel support rods;
- a bidirectional motor mounted on the gear housing and having a drive shaft which is connected to the input gear so as to drive rotatably the input gear;
- a battery unit including a battery holder which is mounted on the stroller frame and which is adapted to receive a storage battery removably therein, the battery holder being provided with electrical contacts adapted for establishing electrical connection with the storage battery; and
- a control unit connected electrically to the motor and the electrical contacts on the battery holder, and operable so as to control direction of rotation of the drive shaft of the motor to control, in turn, forward and backward movement of the stroller frame.

According to another aspect of the present invention, a rear wheel drive assembly is adapted for use with a stroller frame which includes a pair of front wheel support rods, a pair of front wheel units mounted rotatably and respectively on distal ends of the front wheel support rods, a pair of rear wheel support rods, a wheel axle which extends between and which is mounted rotatably on distal ends of the rear wheel support rods, and a pair of rear wheels mounted non-rotatably and respectively on distal ends of the wheel axle for co-rotation therewith. Each of the rear wheels has a wheel frame portion and a tire portion on the wheel frame portion. The rear wheel drive assembly comprises:

- a transmission unit including a gear housing adapted to be mounted on one of the rear wheel support rods, and a speed reducing gear set mounted operably in the gear housing, the gear housing having an open bottom end, the speed reducing gear set including an input gear, an output gear driven rotatably by the input gear, and a knurled roller mounted coaxially on one side of the output gear and extending partially out of the gear housing at the open bottom end, the knurled roller being adapted to contact the tire portion of one of the rear wheels such that rotation of the input gear results in corresponding rotation of the knurled roller in order to generate friction between the knurled roller and said one of the rear wheels for rotating the rear wheels and the wheel axle relative to the rear wheel support rods;
- a bidirectional motor mounted on the gear housing and having a drive shaft which is connected to the input gear so as to drive rotatably the input gear;
- a battery unit including a battery holder which is adapted to be mounted on the stroller frame and which is adapted to receive a storage battery removably therein, the battery holder being provided with electrical contacts adapted for establishing electrical connection with the storage battery; and
- a control unit connected electrically to the motor and the electrical contacts on the battery holder, and operable so as to control direction of rotation of the drive shaft of the motor to control, in turn, forward and backward movement of the stroller frame.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
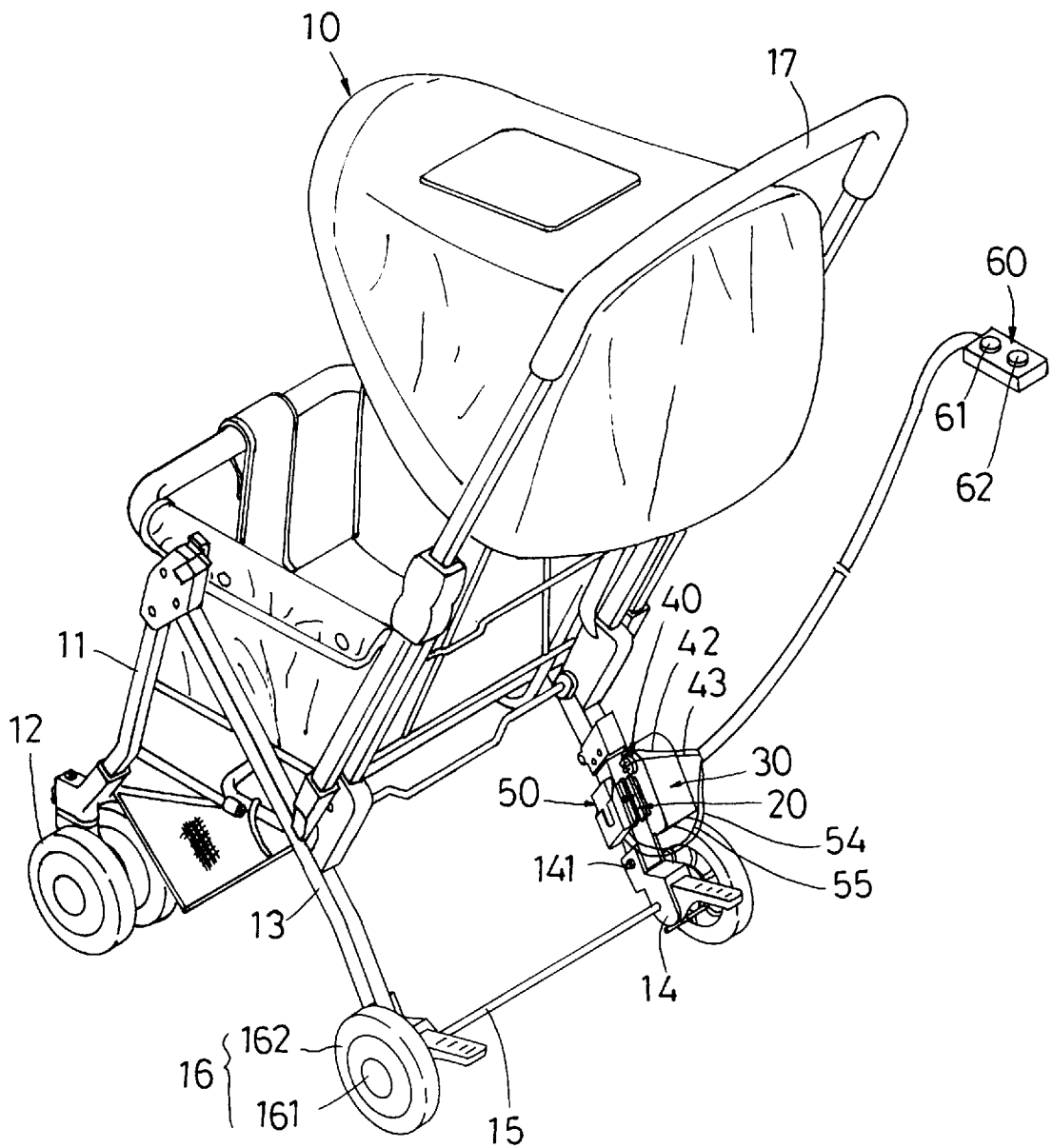
FIG. 1 is a rear perspective view of the preferred embodiment of a motorized stroller with a rear wheel drive assembly in accordance with the present invention.

Referring to FIG. 1, the preferred embodiment of a motorized stroller according to the present invention is shown to comprise a stroller frame 10 and a rear wheel drive assembly including a mounting piece 20, a transmission unit 30, a motor 40, a battery unit 50 and a control unit 60.

The stroller frame 10 includes a pair of front wheel support rods 11 (only one is shown), a pair of front wheel units 12 (only one is shown) mounted rotatably and respectively on distal ends of the front wheel support rods 11, a pair of rear wheel support rods 13, a pair of connectors 14 mounted securely and respectively on distal ends of the rear wheel support rods 13 with the use of screw fasteners 141, a wheel axle 15 carried rotatably by and extending between the connectors 14, a pair of rear wheels 16 mounted non-rotatably and respectively on distal ends of the wheel axle 14 for co-rotation therewith, and a handle member 17 for pushing or pulling the stroller frame 10 in a known manner. Each of the rear wheels 16 has a wheel frame portion 161 and a tire portion 162 on the wheel frame portion 161. In the preferred embodiment, the tire portion 162 is made of ethylene-vinyl acetate (EVA) foam. Since the feature of the present invention does not reside in the particular connection among the many components of the stroller frame 10, a detailed description of the same will be abbreviated herein.

Figure 2:
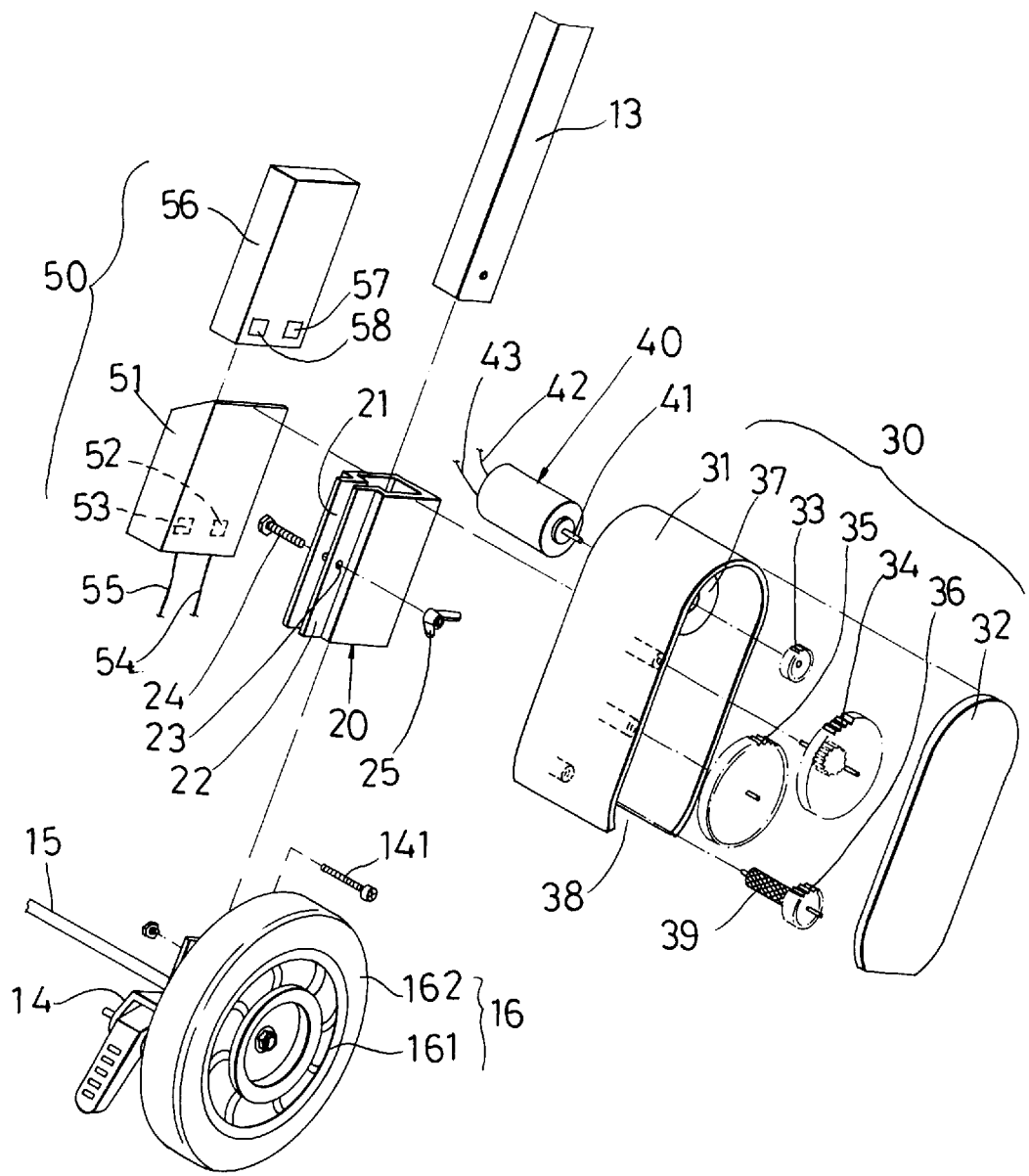
FIG. 2 is an exploded view of the rear wheel drive assembly of the preferred embodiment.
Figure 3:
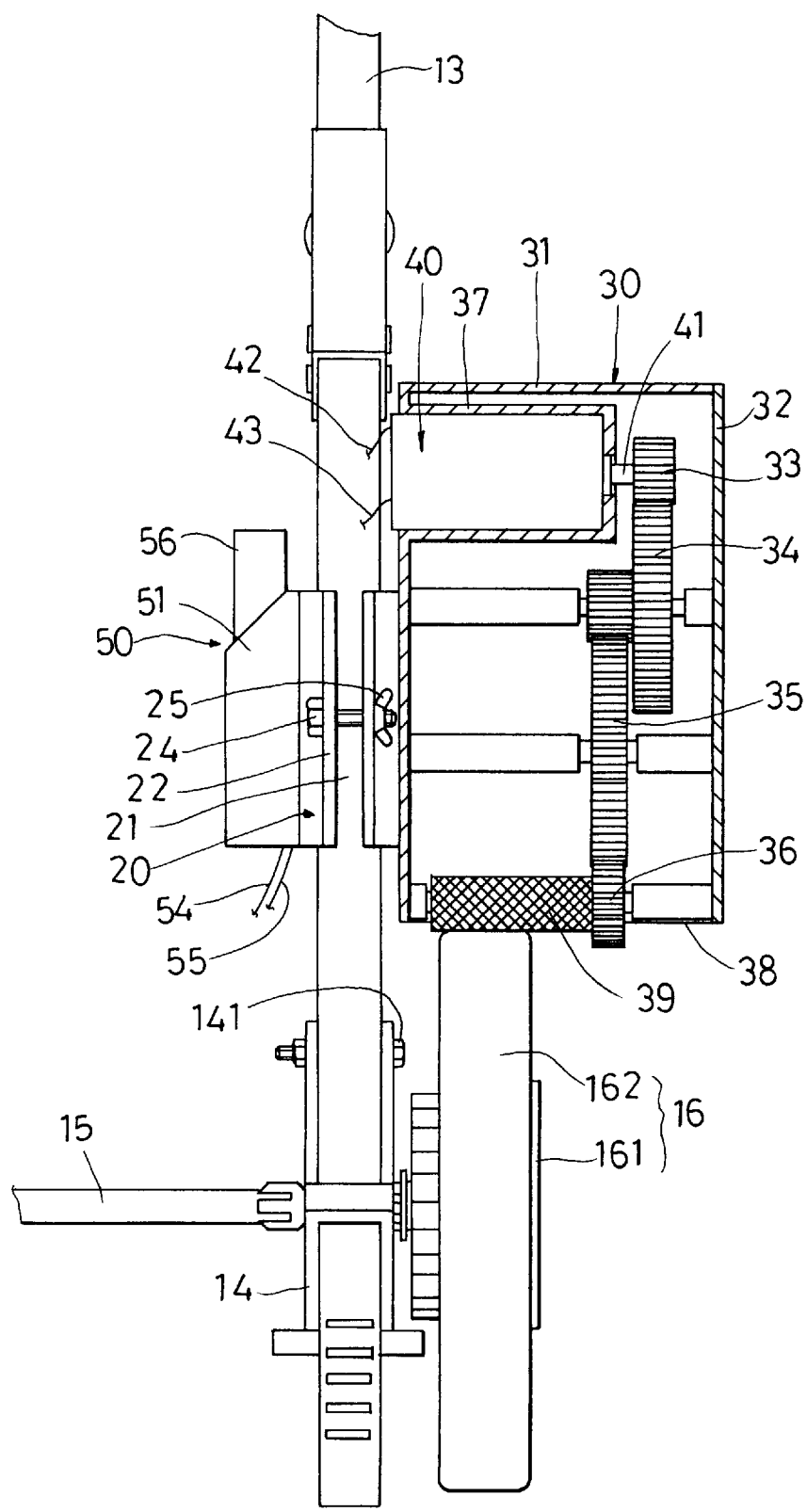
FIG. 3 is a sectional view illustrating the rear wheel drive assembly of the preferred embodiment.

Referring to FIGS. 2 and 3, the mounting piece 20 is formed as a tubular sleeve which is mounted slidably and adjustably on one of the rear wheel support rods 13. The mounting piece 20 has a front side formed with a longitudinally extending slit 21 and a pair of locking flanges 22 which extend transversely from the mounting piece 20 at opposite longitudinal edges of the slit 21. The locking flanges 22 are formed with aligned holes 23, and a fastener, constituted by a bolt 24 which engages a wing nut 25, extends through the aligned holes 23 to secure the mounting piece 20 at a desired position on the rear wheel support rod 13.

When installing the mounting piece 20, the screw fasteners 141 are first loosened to permit removal of the connectors 14 from the rear wheel support rods 13. Thereafter, the mounting piece 20 is sleeved on the selected rear wheel support rod 13 via the distal end of the latter. After mounting the connectors 14 once again on the rear wheel support rods 13, the mounting piece 20 is adjusted to the desired position on the selected rear wheel support rod 13, and is retained thereat with the use of the bolt 24 and the wing nut 25.

The transmission unit 30 includes a gear housing mounted securely on an outer side of the mounting piece 20, such as with the use of an adhesive, so as to be movable with the mounting piece 20 along the selected rear wheel support rod 13, and a speed reducing gear set mounted operably in the gear housing. The gear housing includes a housing body 31 with opposite open and closed lateral sides, and a cover plate 32 mounted on the open lateral side of the housing body 31. The closed lateral side of the housing body 31 has an upper portion that is formed with a motor receiving seat 37. The housing body 31 further has an open bottom end 38.

The speed reducing gear set includes a small input gear 33, a speed changing gear unit 34, a large transmission gear 35 and a small output gear 36 which are mounted rotatably in the gear housing. The speed changing gear unit 34 has an input side with a larger number of gear teeth, and an output side with a smaller number of gear teeth. The input side of the speed changing gear unit 34 meshes with the input gear 33, the output side of the speed changing gear unit 34 meshes with the large transmission gear 35, and the large transmission gear 35 meshes with the small output gear 36. The particular arrangement of the input gear 33, the speed changing gear unit 34, the transmission gear 35 and the output gear 36 results in a higher driving force output at a lower output speed.

The speed reducing gear set further includes a knurled roller 39 mounted coaxially on one side of the output gear 36 and extending partially out of the housing body 31 at the open bottom end 38 so as to permit tight contact with the tire portion 162 of one of the rear wheels 16. As such, rotation of the input gear 33 results in corresponding rotation of the knurled roller 39, and friction is generated between the knurled roller 39 and the rear wheel 16 to cause the rear wheels 16 and the wheel axle 15 to rotate relative to the connectors 14.

The motor 40 is a bidirectional direct current motor which is disposed in the motor receiving seat 37 of the housing body 31. The motor 40 has an axial drive shaft 41 which extends through the housing body 31 and which is connected to the input gear 33 so as to drive rotatably the same.

The battery unit 50 includes a battery holder 51 which is adapted to receive a storage battery 56, such as a rechargeable battery, removably therein. The battery holder 51 is formed as a case with an upwardly oriented access opening and is mounted securely on an inner side of the mounting piece 20 opposite to the gear housing 31, such as with the use of an adhesive, so as to be movable with the mounting piece 20 along the selected rear wheel support rod 13. The battery holder 51 is provided with electrical contacts 52, 53 adapted for establishing electrical connection with corresponding battery contacts 57, 58 on the storage battery 56.

Referring to FIGS. 1 to 3, the control unit 60 includes a pair of first conductors 42, 43 for electrical connection with the motor 40, and a pair of second conductors 54, 55 for electrical connection with the electrical contacts 52, 53 on the battery holder 51. The control unit 60 is provided with forward and reverse control buttons 61, 62 which are operable so as to control the direction of rotation of the drive shaft 41 of the motor 40 to control, in turn, forward and backward movement of the stroller frame 10.

In operation, the forward control button 61 of the control unit 60 is operated to activate the motor 40 and cause the transmission unit 30 to drive one of the rear wheels 16 to rotate in a first direction to result in forward movement of the stroller frame 10 without the need for pushing the latter. Accordingly, the reverse control button 62 of the control unit 60 can be operated to activate the motor 40 and cause the transmission unit 30 to drive said one of the rear wheels 16 to rotate in a second direction opposite to the first direction in order to result in backward movement of the stroller frame 10 without the need for pulling the same.

Figure 4:
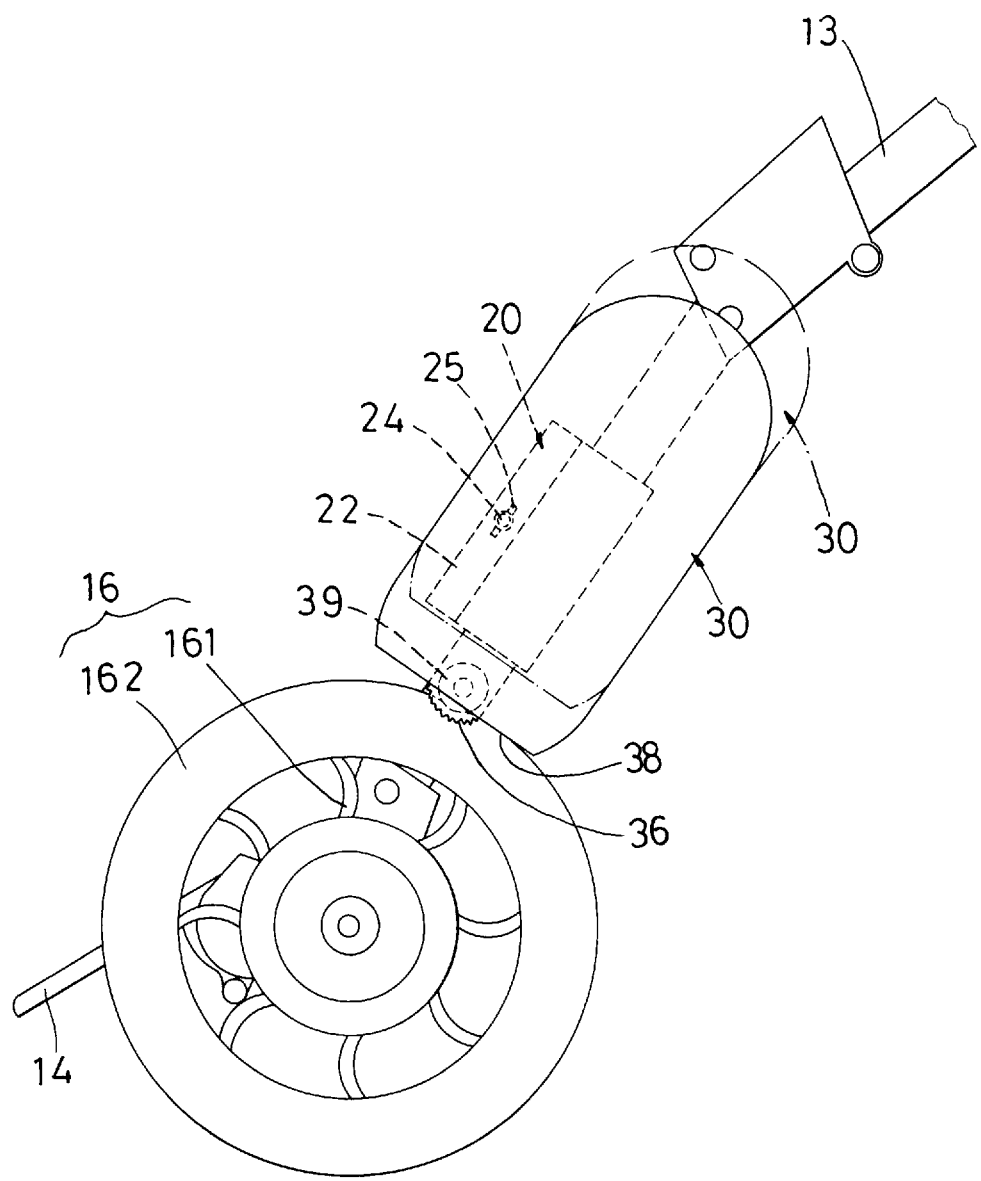
FIG. 4 is a schematic side view of the rear wheel drive assembly of the preferred embodiment.

Referring to FIG. 4, the mounting piece 20 can be slid upwardly along the corresponding rear wheel support rod 13 to move the knurled roller 39 away from the corresponding one of the rear wheels 16. As such, the stroller frame 10 can be manually pulled or pushed at this time.

Since the rear wheel drive assembly of the invention can be easily installed on a conventional stroller frame, it can be sold as a separate unit for upgrading currently available strollers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A motorized stroller comprising:
   a stroller frame including a pair of front wheel support rods, a pair of front wheel units mounted rotatably and respectively on distal ends of said front wheel support rods, a pair of rear wheel support rods, a wheel axle which extends between and which is mounted rotatably on distal ends of said rear wheel support rods, and a pair of rear wheels mounted non-rotatably and respectively on distal ends of said wheel axle for co-rotation therewith, each of said rear wheels having a wheel frame portion and a tire portion on said wheel frame portion;

a transmission unit including a gear housing mounted on one of said rear wheel support rods, and a speed reducing gear set mounted operably in said gear housing, said gear housing having an open bottom end, said speed reducing gear set including an input gear, an output gear driven rotatably by said input gear, and a knurled roller mounted coaxially on one side of said output gear and extending partially out of said gear housing at said open bottom end for contacting said tire portion of one of said rear wheels such that rotation of said input gear results in corresponding rotation of said knurled roller in order to generate friction between said knurled roller and said one of said rear wheels for rotating said rear wheels and said wheel axle relative to said rear wheel support rods;

a bidirectional motor mounted on said gear housing and having a drive shaft which is connected to said input gear so as to drive rotatably said input gear;

a battery unit including a battery holder which is mounted on said stroller frame and which is adapted to receive a storage battery removably therein, said battery holder being provided with electrical contacts adapted for establishing electrical connection with the storage battery; and a control unit connected electrically to said motor and said electrical contacts on said battery holder, and operable so as to control direction of rotation of said drive shaft of said motor to control, in turn, forward and backward movement of said stroller frame.

2. The motorized stroller of claim 1, further comprising a mounting piece mounted slidably and adjustably on said one of said rear wheel support rods, said gear housing being mounted securely on said mounting piece.

3. The motorized stroller of claim 2, wherein said battery holder is mounted securely on said mounting piece opposite to said gear housing.

4. The motorized stroller of claim 2, wherein said mounting piece is formed as a tubular sleeve having a front side formed with a longitudinally extending slit and a pair of locking flanges which extend transversely from said mounting piece at opposite longitudinal edges of said slit, said mounting piece further having a fastener which extends through said locking flanges to secure said mounting piece at a desired position on said one of said rear wheel support rods.

5. A rear wheel drive assembly for use with a stroller frame which includes a pair of front wheel support rods, a pair of front wheel units mounted rotatably and respectively on distal ends of the front wheel support rods, a pair of rear wheel support rods, a wheel axle which extends between and which is mounted rotatably on distal ends of the rear wheel support rods, and a pair of rear wheels mounted non-rotatably and respectively on distal ends of the wheel axle for co-rotation therewith, each of the rear wheels having a wheel frame portion and a tire portion on the wheel frame portion, said rear wheel drive assembly comprising:

a transmission unit including a gear housing adapted to be mounted on one of the rear wheel support rods, and a speed reducing gear set mounted operably in said gear housing, said gear housing having an open bottom end, said speed reducing gear set including an input gear, an output gear driven rotatably by said input gear, and a knurled roller mounted coaxially on one side of said output gear and extending partially out of said gear housing at said open bottom end, said knurled roller being adapted to contact the tire portion of one of the rear wheels such that rotation of said input gear results in corresponding rotation of said knurled roller in order to generate friction between said knurled roller and said one of the rear wheels for rotating the rear wheels and the wheel axle relative to the rear wheel support rods;

a bidirectional motor mounted on said gear housing and having a drive shaft which is connected to said input gear so as to drive rotatably said input gear;

a battery unit including a battery holder which is adapted to be mounted on said stroller frame and which is adapted to receive a storage battery removably therein, said battery holder being provided with electrical contacts adapted for establishing electrical connection with the storage battery; and a control unit connected electrically to said motor and said electrical contacts on said battery holder, and operable so as to control direction of rotation of said drive shaft of said motor to control, in turn, forward and backward movement of the stroller frame.

6. The rear wheel drive assembly of claim 5, further comprising a mounting piece adapted to be mounted slidably and adjustably on said one of the rear wheel support rods, said gear housing being mounted securely on said mounting piece.

7. The rear wheel drive assembly of claim 6, wherein said battery holder is mounted securely on said mounting piece opposite to said gear housing.

8. The rear wheel drive assembly of claim 6, wherein said mounting piece is formed as a tubular sleeve having a front side formed with a longitudinally extending slit and a pair of locking flanges which extend transversely from said mounting piece at opposite longitudinal edges of said slit, said mounting piece further having a fastener which extends through said locking flanges for securing said mounting piece at a desired position on said one of the rear wheel support rods.

* * * * *